US011507670B2

(12) United States Patent
Cmielowski et al.

(10) Patent No.: US 11,507,670 B2
(45) Date of Patent: Nov. 22, 2022

(54) METHOD FOR TESTING AN ARTIFICIAL INTELLIGENCE MODEL USING A SUBSTITUTE MODEL

(71) Applicant: International Business Machines Corporation, Armonk, NY (US)

(72) Inventors: Lukasz G. Cmielowski, Cracow (PL); Rafal Bigaj, Cracow (PL); Wojciech Sobala, Cracow (PL); Maksymilian Erazmus, Zasow (PL)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 16/808,982

(22) Filed: Mar. 4, 2020

(65) Prior Publication Data

US 2021/0279336 A1 Sep. 9, 2021

(51) Int. Cl.
*G06F 21/57* (2013.01)
*G06N 20/00* (2019.01)

(52) U.S. Cl.
CPC .......... *G06F 21/577* (2013.01); *G06N 20/00* (2019.01); *G06F 2221/033* (2013.01)

(58) Field of Classification Search
CPC . G06F 21/577; G06F 2221/033; G06N 20/00; G06N 3/082; G06N 3/0454; G06N 3/0472; G06N 3/084
See application file for complete search history.

(56) References Cited

U.S. PATENT DOCUMENTS

| | | | | |
|---|---|---|---|---|
| 2018/0349605 | A1* | 12/2018 | Wiebe | G06N 3/06 |
| 2019/0179738 | A1* | 6/2019 | Hawthorne | G06F 11/3688 |
| 2019/0213503 | A1* | 7/2019 | Navratil | G06F 9/541 |
| 2020/0125975 | A1* | 4/2020 | Pezeshkpour | G06K 9/628 |
| 2020/0143266 | A1* | 5/2020 | El-Hay | G06N 3/0454 |
| 2020/0342306 | A1* | 10/2020 | Giovannini | G06N 3/0454 |
| 2021/0110253 | A1* | 4/2021 | Büttner | G06K 9/6262 |
| 2021/0241169 | A1* | 8/2021 | Gupta | G06F 11/3466 |

OTHER PUBLICATIONS

Monteiro et al., "Generalizable Adversarial Examples Detection Based on Bi-model Decision Mismatch," arXiv:1802.07770v3, Apr. 22, 2019, 6 pages.
Anonymous, "Machine-Learning for Optimization of Software Parameters," An IP.com Prior Art Database Technical Disclosure, IP.com No. IPCOM000252023D, Dec. 13, 2017, 35 pages.

(Continued)

*Primary Examiner* — J. Brant Murphy
(74) *Attorney, Agent, or Firm* — Nathan M. Rau (57) ABSTRACT

The present disclosure relates to a computer implemented method for testing an artificial intelligence module (AI-module). The method comprises generating a substitute module using first input datasets and first output datasets, wherein the first output datasets are generated on the basis of the first input datasets using the AI-module. Adversarial input datasets are generated on the basis of the first input datasets using the substitute module. The adversarial input datasets are used for assessing a resilience of the AI-module against adversarial attacking by using the first output datasets and second output datasets, wherein the second output datasets are generated on the basis of the adversarial input datasets using the AI-module.

20 Claims, 3 Drawing Sheets

(56) References Cited

OTHER PUBLICATIONS

"Sklearn.metrics.cohen_kappa_score," scikit-learn 0.21.3 documentation, Printed: Nov. 5, 2019, 2 pages. https://scikit-learn.org/stable/modules/generated/sklearn.metrics.cohen_kappa_score.html.

"Sklearn.metrics.accuracy_score," scikit-learn 0.21.3 documentation, Printed Nov. 5, 2019, 3 pages. https://scikit-learn.org/stable/modules/generated/sklearn.metrics.accuracy_score.html#sklearn.metrics.accuracy_score.

"Welcome to the Adversarial Robustness 360 Toolbox," Adversarial Robustness Toolbox, Printed Nov. 5, 2019, 5 pages, https://adversarial-robustness-toolbox.readthedocs.io/en/latest/index.html.

* cited by examiner

METHOD FOR TESTING AN ARTIFICIAL INTELLIGENCE MODEL USING A SUBSTITUTE MODEL

BACKGROUND

The present disclosure relates to the field of digital computer systems, and more specifically, to a method for testing an artificial intelligence module.

The utility of artificial intelligence modules depends on their resilience against attacking, such as adversarial attacking. For example, an artificial intelligence module (AI-module) for autonomous driving need to be robust enough to guarantee a safe trip with a car. If the AI-module gets fooled by an adversarial attack it may cause an accident. The goal of adversarial attacking may be that the AI-module for autonomous driving may classify a traffic sign wrongly. For that, an image with a traffic sign with added noise may be passed to the AI-module enforcing the AI-module to classify that traffic sign as a different traffic sign.

SUMMARY

Various embodiments provide a computer implemented method for testing an artificial intelligence module, a computer program product and a computer system as described by the subject matter of the independent claims. Advantageous embodiments are described in the dependent claims. Embodiments of the present disclosure can be freely combined with each other if they are not mutually exclusive.

In one aspect, the disclosure relates to a computer implemented method for testing an artificial intelligence module (AI-module). The method comprises:

sending first input datasets to an interface of the AI-module for processing the first input datasets by the AI-module;

receiving first output datasets calculated by the AI-module on the basis of the first input datasets via the interface of the AI-module, each first output dataset corresponding to a respective one of the first input datasets;

generating a substitute module using the first input datasets and the first output datasets, the substitute module substituting the AI-module;

generating adversarial input datasets on the basis of the first input datasets using the substitute module;

sending the adversarial input datasets to the interface of the AI-module for processing the adversarial input datasets by the AI-module;

receiving second output datasets calculated by the AI-module on the basis of the adversarial input datasets via the interface of the AI-module, each second output dataset corresponding to a respective one of the adversarial input datasets;

assessing a resilience of the AI-module against adversarial attacking by using the first output datasets and the second output datasets, wherein sending the adversarial input datasets to the interface of the AI-module represents the adversarial attacking.

In another aspect, the disclosure relates to a computer program product comprising a computer-readable storage medium having computer-readable program code embodied therewith, the computer-readable program code configured to implement the method according to preceding embodiments.

In another aspect, the disclosure relates to a computer system for testing an artificial intelligence module (AI-module), the computer system being configured for:

sending first input datasets to an interface of the AI-module for processing the first input datasets by the AI-module;

receiving first output datasets calculated by the AI-module on the basis of the first input datasets via the interface of the AI-module, each first output dataset corresponding to a respective one of the first input datasets;

generating a substitute module using the first input datasets and the first output datasets, the substitute module substituting the AI-module;

generating adversarial input datasets on the basis of the first input datasets using the substitute module;

sending the adversarial input datasets to the interface of the AI-module for processing the adversarial input datasets by the AI-module;

receiving second output datasets calculated by the AI-module on the basis of the adversarial input datasets via the interface of the AI-module, each second output dataset corresponding to a respective one of the adversarial input datasets;

assessing a resilience of the AI-module against adversarial attacking by using the first output datasets and the second output datasets, wherein sending the adversarial input datasets to the interface of the AI-module represents the adversarial attacking.

BRIEF DESCRIPTION OF THE DRAWINGS

The following embodiments of the disclosure are explained in greater detail, by way of example only, making reference to the drawings in which.

DETAILED DESCRIPTION

The description of the various embodiments of the present disclosure are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method may enable to test the AI-module without any access to internal functions of the AI-module. For the testing of the AI-module according to the present method only access to the interface of the AI-module, in the following referred to as interface, may be needed. Via the interface requests to the AI-module in the form of the first input datasets may be sent, the first output datasets may be received from the AI-module, the adversarial input datasets may be sent to the AI-module and the second output datasets may be received from the AI-module. This kind of twofold sending and receiving data to and from the AI-module may be referred to as data transfer in the following. Based on the first and second output datasets the resilience of the AI-module against adversarial attacking may be assessed.

Furthermore, according to the present method there is no access to training data required, with which the AI-module may have been trained before the testing. The interface may be designed in the form of a REST-API. The REST-API may provide a common interface structure in world wide web applications. For example, the AI-module may be hosted on a web server and may be accessible via the REST-API for the data transfer.

The term "module" as used herein refers to any known or in the future developed hardware, software such as an executable program, artificial intelligence, fuzzy-logic or combination hereof for performing a function associated with the "module" or being a result of having performed the function associated with the "module".

With respect to the substitute module, a function of the substitute module may be to imitate the AI-module as accurately as possible when sending a request to the substitute module in the form of a test input dataset. The substitute module may imitate the AI-module accurately if a first test output dataset calculated by the AI-module on the basis of the test input dataset comprises the same values as a second test output dataset calculated by the substitute module on the basis of the test input dataset. A difference vector between the first test output dataset and the second test output dataset may be calculated to assess how accurately the substitute module may imitate the AI-module. A norm of the difference vector may indicate how accurately the substitute module may imitate the AI-module. The lower the norm, the more accurately the substitute module may imitate the AI-module.

A further function of the substitute module may be to replace the AI-module with the substitute module for generating the adversarial input datasets. Internal functions of the substitute module may be accessible. For example, the substitute module with its internal functions may be stored in a volatile or persistent storage device of a computer system used to generate the adversarial input datasets. For that reason, the adversarial input datasets may be generated using so called white box attacking methods, such as the spatial transformation attack method, the zeroth order oracle attack method, the decision based attack method, the query-efficient black box attack method and the fast gradient method. The term "white box attack method" refers to an attack method, for which an access to internal functions of an exemplary AI-module, which may be in the focus of an exemplary adversarial attack, in this case the substitute module, may be necessary. Hence, for generating the adversarial input datasets the substitute module may substitute the AI-module.

The substitute module may be generated using machine learning. The term "machine learning" refers to a computer algorithm used to extract useful information from the first input datasets and the first output datasets. The information may be extracted by building probabilistic models in an automated way. The machine learning may be performed using one or more known machine learning algorithms such as linear regression, backpropagation, K-means, classification algorithms, etc.

A probabilistic model may, for example, be an equation or set of rules that makes it possible to predict a category on the basis of one of the first input datasets or to group an instance corresponding to one of the first input datasets into a cluster. The probabilistic model may be configured to provide a confidence score for each prediction or grouping it may perform. The confidence score of the prediction or the grouping may indicate the correctness of the prediction and the grouping respectively.

The machine learning for generating the substitute module may be performed by using a machine learning module. The machine learning module may be provided by a machine learning program being executable on a computer system. By running the machine learning program on the computer system the above described functions associated with machine learning may be provided, such as performing one of the machine learning algorithms and/or building the probabilistic model on the basis of the first input datasets and the first output datasets. Preferably, the machine learning module may generate the substitute module as a neuronal net, a convolutional neuronal net and or a radial basis function net on the basis of the first input datasets and the first output datasets using one of the machine learning algorithms.

For example, the substitute module may be designed as or may comprise a neuronal net, a convolutional neuronal net and or a radial basis function net. The internal functions of the substitute module may comprise sigmoidal functions such as hyperbolic tangent, sinus and cosine. The advantage of at least one of the internal functions being a hyperbolic tangent may be that the function value of the hyperbolic tangent converges to "1" or "−1" if the argument of the hyperbolic tangent converges to infinity and minus infinity respectively. This may cause that the substitute module may not heavily overshoot in subspaces of an admissible input space of the substitute module that may not be covered by the first input datasets.

An advantage using machine learning to generate the substitute model may be that no expert for a certain classification problem the AI-module may be applied to may be needed to create or select the internal functions of the substitute module. In case, the AI-module may be built for disease diagnostics no medical practitioner may be needed for generating the substitute module. Furthermore, an executable program to perform an extraction of the above mentioned information may not necessarily be adapted to the classification problem or another kind of problem the AI-module may be applied to. So, using machine learning for the generation of the substitute module may work well with software not being customized for the problem the AI-module may be applied to.

According to some embodiments, the method further comprises calculating a first metric for assessing the resilience of the AI-module against adversarial attacking. The first metric may enable a non-expert in the field of machine learning or data science to judge how strong the resilience of the AI-module against adversarial attacking may be. For example, the resilience of the AI-module may be directly proportional to the first metric. Furthermore, the first metric may facilitate comparisons with other AI-modules.

According to some embodiments, the method further comprises calculating a first score as the first metric, the first score representing a proportion of successful adversarial attacks from all adversarial attacks using the adversarial input datasets. By viewing the first score, the non-expert may quickly assess the accuracy of the adversarial attacks and may associate a high value of the accuracy with a weak resilience of the AI-module against adversarial attacking.

According to some embodiments, the method further comprises generating the adversarial input datasets according to a zeroth order oracle attack method.

According to some embodiments, the method further comprises generating the adversarial input datasets according to a decision based attack method.

According to some embodiments, the method further comprises generating the adversarial input datasets according to a query-efficient black box attack method.

According to some embodiments, the method further comprises generating the adversarial input datasets according to a fast gradient method. In a first use case the first input datasets may each comprise values of pixels such that each first input dataset represents an image. In this first use case, the input datasets may be designed each in the form of a respective matrix with entries of the respective matrix corresponding to color codes of the pixels. In this first use case, the fast gradient method may provide changing the values of the entries of each first input dataset as a function of a loss function. The loss function may be a function which may be used generating the substitute module. The loss function may be a cross-entropy loss.

According to some embodiments, the method further comprises generating the adversarial input datasets according to a spatial transformation attack method. According to this embodiment, considering the first use case, the location of the pixels in each image may be changed. This may be realized by swopping entries of the matrices. This may cause that the adversarial input datasets may be more difficult to defend. Hence, using the adversarial input datasets generated according to this embodiment may result in a tougher testing of the AI-module. According to another embodiment, the values of the pixels and the location of the pixels in the image may be changed.

According to some embodiments, the method further comprises generating a set of potential substitute modules with different module architectures using the first input datasets and the first output datasets, each potential substitute module substituting the AI-module and performing a comparison of performances of the potential substitute modules with respect to how accurately the potential substitute modules imitate the AI-module. In a first example of this embodiment, the substitute module may be selected from one of the potential substitute modules on the basis of the comparison. As the potential substitute modules comprise different module architectures, they may perform differently in imitating the AI-module. The norm of the difference vector mentioned above may be calculated for each potential substitute module for performing the comparison. Beside the different module architectures, the potential substitute modules may be trained differently. This may cause different performances among the potential substitute modules as well. Selecting the substitute module from one of the potential substitute modules may increase the chance that the substitute module may imitate the AI-module as accurately as theoretically possible. In a second example of this embodiment, the substitute module may comprise at least two of the potential substitute modules. In this example, the substitute module may be used for generating the adversarial input datasets by using the two of the potential substitute modules in parallel and concatenating results of the two of the potential substitute modules to a concatenated result.

According to some embodiments, the method further comprises performing the comparison of the performances of the potential substitute modules with respect to how accurately the potential substitute modules imitate the AI-module on the basis of a second metric. The second metric may enable a non-expert in the field of machine learning or data science to judge how accurately the potential substitute modules may imitate the AI-module. For example, if the above mentioned norm may be calculated for each potential substitute module, an accuracy of imitating the AI-module of that potential substitute module may be reciprocally proportional to that norm. In order to sum up a result of the comparison of the performances of the potential substitute modules, the norm of all potential substitute modules with the lowest value may be selected as the second metric.

According to some embodiments, the second metric is a Cohen's kappa coefficient. The advantage of using the Cohen's kappa coefficient as the second metric may that an agreement between each potential substitute module and the AI-module occurring by chance may be taken into account.

According to some embodiments, the method further comprises
constructing non-adversarial input datasets and determining non-adversarial output datasets on the basis of the non-adversarial input datasets using the substitute module, each non-adversarial output dataset corresponding to a respective one of the non-adversarial input datasets;
sending the non-adversarial input datasets to the interface of the AI-module for processing the non-adversarial input datasets by the AI-module;
receiving third output datasets calculated by the AI-module on the basis of the non-adversarial input datasets via the interface of the AI-module, each third output dataset corresponding to a respective one of the non-adversarial input datasets;
assessing the resilience of the AI-module against adversarial attacking in relation to non-adversarial use cases of the AI-module using the non-adversarial output datasets and the third output datasets, the non-adversarial use cases comprising an application of the AI-module to the non-adversarial input datasets.

By assessing the resilience of the AI-module against adversarial attacking in relation to the non-adversarial use cases, a cross-validation may be performed. This may be more accurate, as the substitute module may not accurately imitate the AI-module.

According to some embodiments, the method further comprises calculating a third metric for assessing the resilience of the AI-module against adversarial attacking in relation to the non-adversarial use cases of the AI-module. The third metric may be easy to understand for non-experts and may facilitate comparisons with other AI-modules.

According to some embodiments, the method further comprises calculating a second score as the third metric, the second score representing a ratio of a number of true positive instances to a sum of a number of the true positive instances and a number of false positive instances, the true positive instances representing cases, for which the adversarial attacking is successful, the false positive instances representing cases, for which the non-adversarial output datasets deviate from the third output datasets.

According to some embodiments, the method further comprises retraining the AI-module using the adversarial input datasets. This may enhance the resilience of the AI-module against adversarial attacking. A continuous learning system may be applied for retraining the AI-module. The continuous learning system may provide a continuous monitoring on the resilience of the AI-module. The monitoring may comprise continuous recalculation of the first metric, preferably of the first score.

According to some embodiments, the method further comprises training a classifier for classifying an adversarial attack to the AI-module using the adversarial input datasets and the first input datasets. The classifier may be used to protect the AI-module from penetration of adversarial attacks. By classifying correctly the adversarial attack using the classifier a request from an identified source of the adversarial attack may be blocked. A blocking may be performed by adjusting a firewall of the second computer system 120.

According to some embodiments, the method further comprises using the classifier for assessing a risk of the AI-module being under adversarial attack with respect to a batch of further input datasets, the further input datasets comprising further adversarial input datasets for the AI-module and further non-adversarial input datasets for the AI-module, calculating a fourth metric on the basis of the batch of the further input datasets using the classifier, the fourth metric representing the risk of the AI-module being under adversarial attack. According to this embodiment, the fourth metric may be an indicator if the AI-module is under adversarial attack. As the fourth metric may be calculated on the basis of the batch of the further input datasets, the risk of provoking a false alarm may be reduced. An alarm may only be sent if the fourth metric is above a given first threshold.

According to some embodiments, the fourth metric may represent a ratio of a number of detected adversarial attacks to the AI-module being detected by the classifier to a number of detected non-adversarial use cases of the AI-module being detected by the classifier. According to this embodiment, the fourth metric may be easily understood by a non-expert in the field of data science or machine learning.

Figure 1:
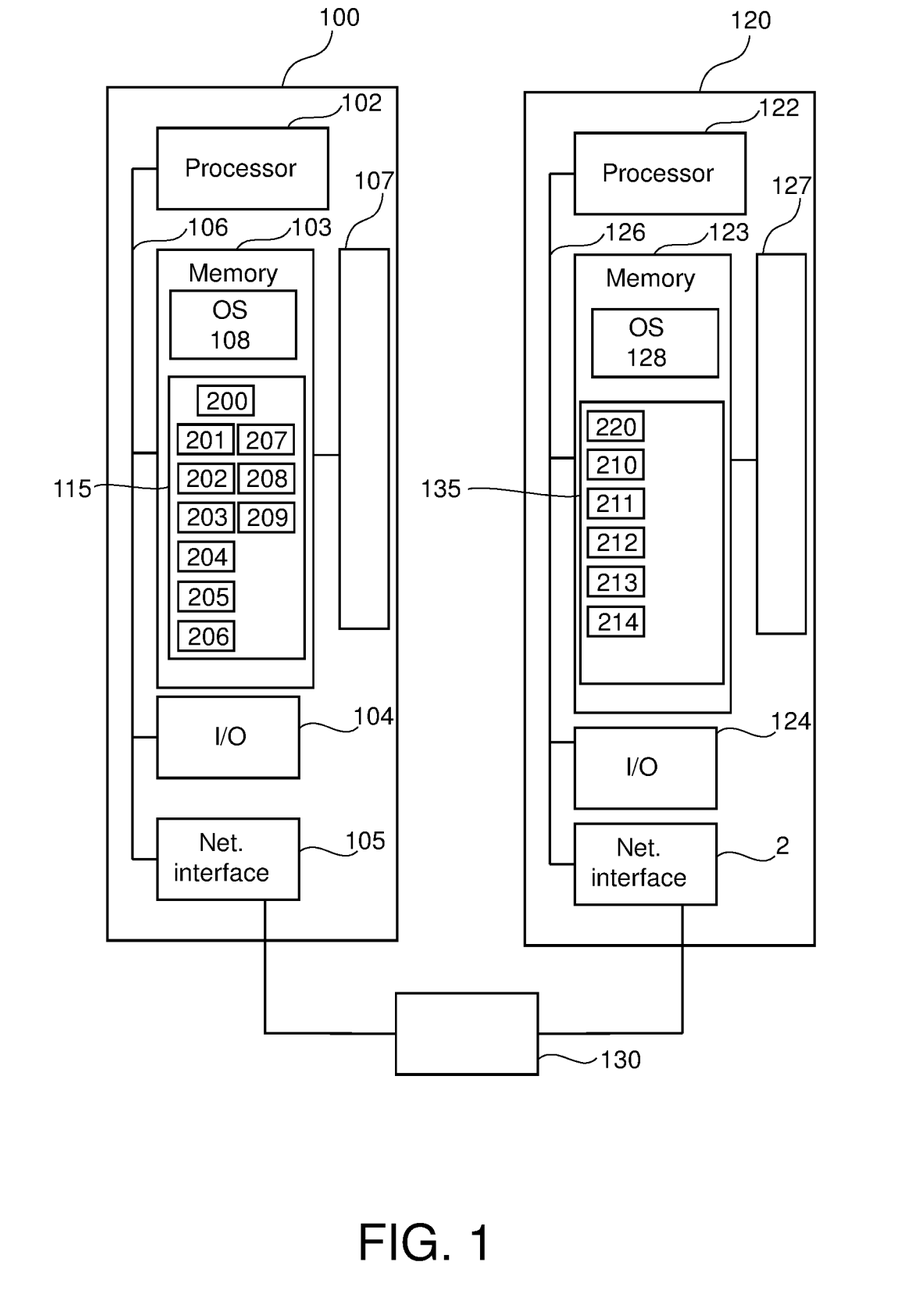
FIG. 1 depicts a first computer system for testing an AI-module that can be used to implement features of the present disclosures and a second computer system for executing the AI-module.

FIG. 1 shows a first computer system 100 for testing an artificial intelligence module (AI-module) 1. The first computer system 100 may be suited for performing method steps as involved in the disclosure. The first computer system 100 may include a first processor 102, a first memory 103, a first I/O circuitry 104 and a first network interface 105 coupled together by a first bus 106.

The first Processor 102 may represent one or more processors (e.g. microprocessors). The first memory 103 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the first memory 103 may have a distributed architecture, where various components are situated remote from one another, but may be accessed by the first processor 102.

The first memory 103 in combination with a first persistent storage device 107 may be used for local data and instruction storage. The first storage device 107 includes one or more persistent storage devices and media controlled by the first I/O circuitry 104. The first storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The first memory 103 may include one or more separate programs, each of which comprises an ordered listing of executable instructions for implementing logical functions, notably functions involved in examples. The software in the first memory 103 may also typically include a first suitable operating system (OS) 108. The first OS 108 essentially controls the execution of other computer programs for implementing at least part of methods as described herein.

The first computer system 100 may be configured for functions such as executing the above mentioned functions associated with the machine learning module on the first computer system 100, in the following referred to as first functions. The first functions may comprise performing one of the machine learning algorithms, e.g. adapting values of parameters of first model functions of a first neuronal net, a first convolutional neuronal net and or a first radial basis function net, storing a first structure and values of parameters of the first neuronal net, the first convolutional neuronal net and or the first radial basis function net on the first storage device 107, testing the first neuronal net, the first convolutional neuronal net and or the first radial basis function net.

Furthermore, the first computer system 100 may be configured for functions such as executing the above mentioned functions associated with the substitute module on the first computer system 100, in the following referred to as second functions. The second functions may comprise loading the first structure and values of parameters of the first model functions of the first neuronal net, the first convolutional neuronal net and or the first radial basis function net from the first storage device 107 into the first memory 103, calculating an output dataset dependent on an input dataset, the first structure and the first model functions and the values of their parameters.

Furthermore, the first computer system 100 may be configured for functions such as sending first input datasets 11 to an interface 2 of the AI-module 1 for processing the first input datasets 11 by the AI-module 1, in the following referred to as third function, receiving first output datasets 12 calculated by the AI-module 1 on the basis of the first input datasets 11 via the interface 2 of the AI-module 1, in the following referred to as fourth function, generating a substitute module 3 using the first input datasets 11 and the first output datasets 12, the substitute module 3 substituting the AI-module 1, in the following referred to as fifth function, generating adversarial input datasets 13 on the basis of the first input datasets 11 using the substitute module 3, in the following referred to as sixth function, sending the adversarial input datasets 13 to the interface 2 of the AI-module 1 for processing the adversarial input datasets 13 by the AI-module 1, in the following referred to as seventh function, receiving second output datasets 14 calculated by the AI-module 1 on the basis of the adversarial input datasets 13 via the interface 2 of the AI-module 1, in the following referred to as eighth function, assessing a resilience of the AI-module 1 against adversarial attacking by using the first output datasets 11 and the second output datasets 14, in the following referred to as ninth function.

The first computer system 100 may perform the first and second functions and the third, fourth, fifth, sixth, seventh, eighth and ninth function by executing a first program 201, a second program 202, a third program 203, a fourth program 204, a fifth program 205, a sixth program 206, a seventh program 207, an eighth program 208 and a ninth program 209 respectively. The testing of the AI-module 1 may be performed by executing a main program 200 on the first processor 102. The main program 200 may initiate an execution of the programs 201, 202, 203, 204, 205, 206, 207, 208, 209 on the first processor 102.

The substitute module 3 may be considered as an entity comprising the first structure and the values of parameters of the first model functions and program 202 for running the first neuronal net, the first convolutional neuronal net and/or the first radial basis function net on the first processor 102 being loaded in a cache of the first processor 102.

FIG. 1 shows a second computer system 120. The second computer system 120 may be suited for executing AI-module 1.

Second computer system 120 may include a second processor 122, a second memory 123, a second I/O circuitry 124 and the interface 2, which may be designed as a network interface, coupled together by a second bus 126.

The second Processor 122 may represent one or more processors (e.g. microprocessors). The second memory 123 may include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the second memory 123 may have a distributed architecture, where various components are situated remote from one another, but may be accessed by the second processor 122.

The second memory 123 in combination with a second persistent storage device 127 may be used for local data and instruction storage. The second storage device 127 includes one or more persistent storage devices and media controlled by the second I/O circuitry 124. The second storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

The second memory 123 may include one or more separate programs, each of which comprises an ordered listing of executable instructions for implementing logical functions, notably functions involved in examples. The software in the second memory 123 may also typically include a second suitable operating system (OS) 128. The second OS 128 essentially controls the execution of other computer programs for implementing at least part of methods as described herein.

The second computer system 120 may be configured for functions such as executing the AI-module 1 on the second computer system 120, in the following referred to as tenth functions. The tenth functions may comprise loading a second structure and values of parameters of second model functions of a second neuronal net, a second convolutional neuronal net and or a second radial basis function net from the second storage device 127 into the second memory 123, calculating the first output datasets 12 dependent on the first input datasets 11, the second structure, the second model functions and the values of the parameters of the second model functions, calculating the second output datasets 14 dependent on the adversarial input datasets 13, the second structure, the second model functions and the values of the parameters of the second model functions.

Furthermore, the second computer system 120 may be configured for functions such as receiving the first input datasets 11 via the interface 2, in the following referred to as eleventh function, sending the first output datasets 12 via the interface 2, in the following referred to as twelfth function, receiving the adversarial input datasets 13 via the interface 2, in the following referred to as thirteenth function and sending the second output datasets 14 via the interface 2, in the following referred to as fourteenth function.

The second computer system 120 may perform the tenth functions and the eleventh, the twelfth, the thirteenth, the fourteenth function by executing a tenth program 210, a eleventh program 211, a twelfth program 212, a thirteenth program 213 and a fourteenth program 214 respectively. An execution of the programs 210, 211, 212, 213, 214 may be initiated by executing a second main program 220 on the second processor 122.

The AI-module 1 may be considered as an entity comprising the second structure and the values of parameters of the second model functions and program 210 for running the second neuronal net, the second convolutional neuronal net and/or the second radial basis function net on the second processor 122 being loaded in a cache of the second processor 122.

The term "program" as used herein refers to a set of instructions which contains commands to provoke actions performed at least by one of the processors 102, 122 when at least one of the processors 102, 122 may read the commands. The set of instructions may be in the form of a computer-readable program, routine, subroutine or part of a library, which may be executed by at least one of the processors 102, 122 and/or may be called by a further program being executed by at least one of the processors 102, 122. Preferably the programs 200, 220, 201, 202, 203, 204, 205, 206, 207, 208, 209, 210, 211, 212, 213, 214 may be executable programs which are compiled according to a type of hardware platform of the computer systems 100, 120 respectively. The first memory 103 may comprise a space for storing the programs 200, 201, 202, 203, 204, 205, 206, 207, 208, 209; the space hereinafter referred to as first function memory 115. The second memory 123 may comprise a space for storing the programs 220, 210, 211, 212, 213, 214; the space hereinafter referred to as second function memory 135.

Figure 2:
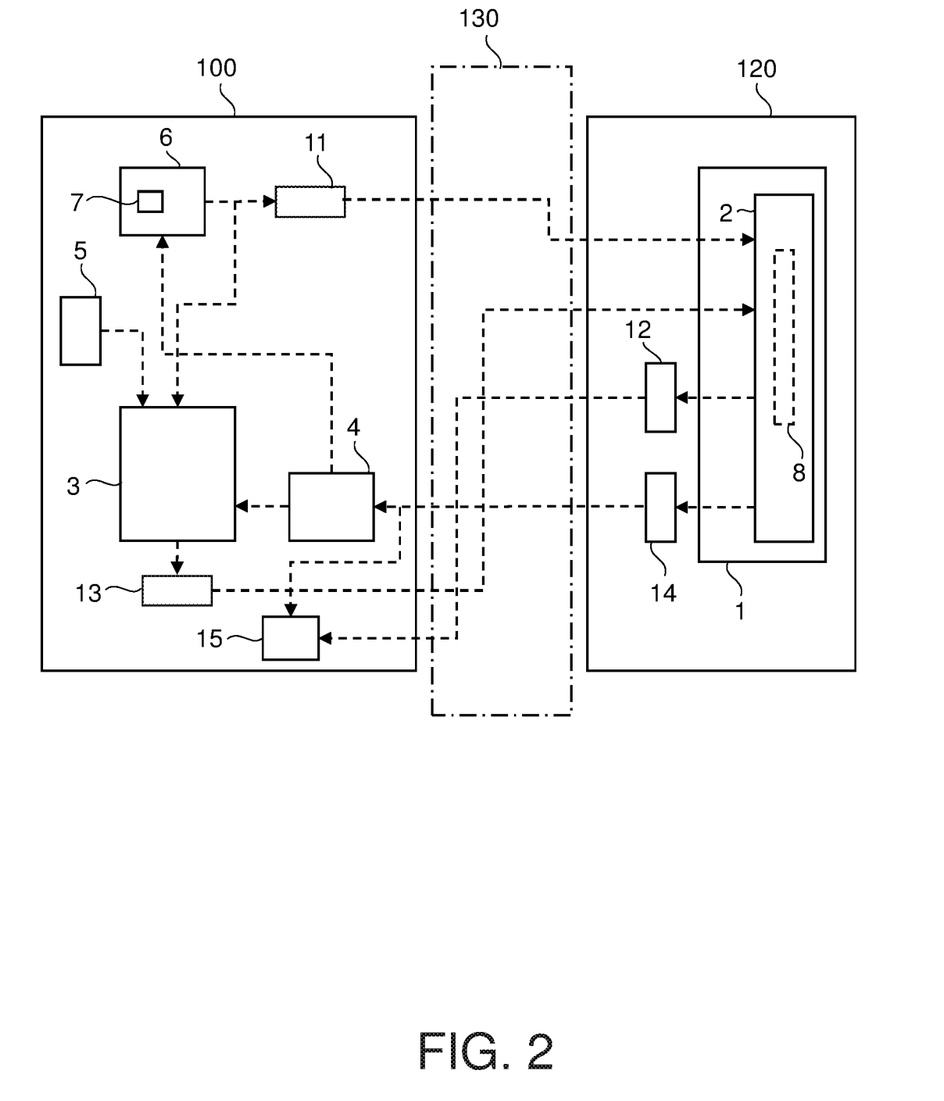
FIG. 2 depicts a block diagram describing a dataflow between the first computer system and the second computer system shown in FIG. 1.

FIG. 2 depicts a block diagram for showing a dataflow between the first computer system 100 and the second computer system 120. The first network interface 105 may be communicatively coupled with the second network interface 2 via the world wide web 130.

Figure 3:
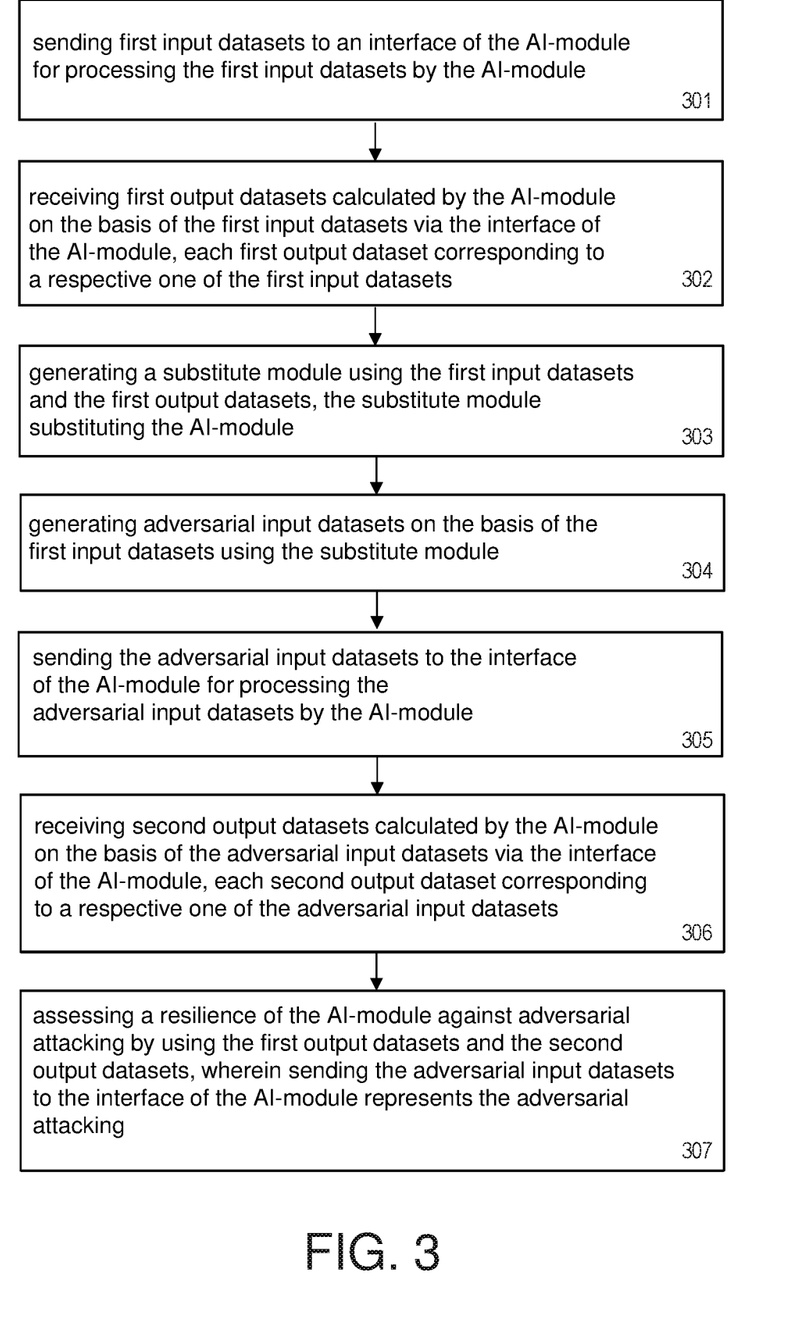
FIG. 3 shows a flowchart of a computer implemented method for testing the AI-module shown in FIG. 2.

FIG. 3 shows a flowchart of a computer implemented method for testing the AI-module 1. The flowchart may also explain the dataflow between the first computer system 100 and the second computer system 120.

In step 301, the first input datasets 11 may be send to the interface 2 of the AI-module 1 for processing the first input datasets 11 by the AI-module 1. With respect to the first use case, the first input datasets 11 and the adversarial input datasets 13 may be designed each in the form of a respective matrix with entries of the respective matrix corresponding to color codes. The entries of each matrix may each correspond to a pixel of a picture, which the respective matrix and the respective one of the first input datasets and the respective one of adversarial input datasets 13 may represent respectively.

In step 302, the first output datasets 12 calculated by the AI-module on the basis of the first input datasets 11 may be received by the first computer system 100 via the interface 2 of the AI-module 1. Each first output dataset of the first output datasets 12 may correspond to a respective one of the first input datasets 11. The term "correspond" means that the corresponding one of the first output datasets 12 may be calculated as a function of the respective one of the first input datasets 11 using the AI-module 1. Considering the first use case, the first output datasets 12 and the second output datasets 14 may be designed each in the form of a vector with n elements. Each element of the first output datasets 12 and the second output datasets 14 may be associated with a different entity. For example, the first element of each one of the first output datasets 12 and the second output datasets 14 may be associated with a stop sign and the second element of each one of the first output datasets 12 and the second output datasets 14 may be associated with a traffic sign indicating a certain speed limit. For sake of simplicity, it will be assumed that n is equal to two in the following. In further use cases, n may be equal to 50 or higher.

In step 303, the substitute module 3 may be generated using the first input datasets 11 and the first output datasets 12. This may be realized by executing program 201 on the first processor 102. By running the program 201 on the first processor 102 a machine learning module 4 may be set up on the first processor 102. The machine learning module 4 may perform one of the machine learning algorithms, e.g. the backpropagation algorithm. Preferably, the machine learning module 4 may adapt the first structure and/or the values of parameters of first model functions of the first convolutional neuronal net on the basis of the first input datasets 11 and the first output datasets 12 using one of the machine learning algorithms In response to adapting the first structure and/or the values of parameters of first model functions of the first convolutional neuronal net using one of the machine learning algorithms these values and the first structure may be considered as adapted.

The adapted values of parameters of first model functions of the first convolutional neuronal net may be considered as values of parameters of the substitute module 3. Similarly, the first structure and the first model functions of the first convolutional neuronal net may be considered as a structure and model functions of the substitute module 3 respectively. The substitute module 3 may be considered as an entity of the structure, the values of parameters and the model functions of the substitute module 3 and program 203 being loaded in a cache of the first processor 102.

In a further example, in step 303, a set of potential substitute modules may be generated using the first input datasets 11 and the first output datasets 12 and preferably the machine learning module 4. In order to achieve different potential substitute modules the machine learning module 4 may initialize the values of the parameters of the first model functions anew each time the machine learning module 4 may perform one of the machine learning algorithms for generating one of the potential substitute modules. In addition to that, the machine learning module 4 may change the first structure of the first neuronal net, the first convolutional neuronal net and or the first radial basis function net each time the machine learning module 4 may perform one of the machine learning algorithms for generating one of the potential substitute modules. Changing the first structure may comprise changing the number of neurons, the number of hidden layers and/or the type of connections between the neurons.

The machine learning module 4 may perform a comparison of performances of the potential substitute modules with respect to how accurately the potential substitute modules imitate the AI-module 1. The machine learning module 4 may select the substitute module 3 from one of the potential substitute modules on the basis of the comparison. The comparison may be performed on the basis of a second metric. The norm of the difference vector mentioned above may be calculated for each potential substitute module as the second metric. The Cohen's kappa coefficient may be used as well to compare the performances.

In a further example, a number of the first input datasets 11 may be increased if none of the second metric may meet a given second threshold. The first input datasets 11 may be loaded from an archive 6. In this case, step 301, step 302 and step 303 may be executed again.

In step 304, the adversarial input datasets 13 may be generated on the basis of the first input datasets 11 using the substitute module 3. The adversarial input datasets 13 may be generated by using an adversarial module 5. The adversarial module 5 may apply an adversarial attacking method to the substitute module 3 for generating the adversarial input datasets 13. The adversarial attacking method may preferably be one of the white box attacking methods, such as the spatial transformation attack method or the fast gradient method.

In step 305, the adversarial input datasets 13 may be sent to the interface 2 of the AI-module 1 for processing the adversarial input datasets 13 by the AI-module 1.

In step 306, the second output datasets 14 calculated by the AI-module 1 on the basis of the adversarial input datasets 13 via the interface 2 of the AI-module 1 may be received by the first computer system 100, each one of the second output datasets 14 corresponding to a respective one of the adversarial input datasets 13. The term "corresponding" means that the corresponding one of the second output datasets 14 may be calculated as a function of the respective one of the adversarial input datasets 13 using the AI-module 1. To calculate the second output datasets 14, the program 210 may be executed on the second processor 122.

In step 307, a resilience of the AI-module against adversarial attacking may be assessed by using the first output datasets 12 and the second output datasets 14, wherein sending the adversarial input datasets 13 to the interface 2 of the AI-module 1 represents the adversarial attacking. In a first example, the above mentioned first score may be calculated for assessing the resilience. The first score may represent a proportion of successful adversarial attacks from all adversarial attacks using the adversarial input datasets. Sending one of the adversarial input datasets 13 to the interface 2 for getting a response in the form of one of the second output datasets 14 may be considered as one of the adversarial attacks.

With respect to the first use case, a successful adversarial attack may be considered if one of the first output datasets 12 may indicate a different traffic sign compared to one of the second output datasets 14 corresponding to the same one of the first input datasets 11. The term "corresponding to the same one of the first input datasets 11" means that the one of the first output datasets 12 may be calculated on the basis of its corresponding one of the input datasets 11, in the following referred to as basis input dataset, as mentioned above and the one of the second output datasets 14 may be calculated on the basis of its corresponding one of the adversarial input datasets 13, in the following referred to as basis adversarial input dataset, as mentioned above and that the basis adversarial input dataset may be calculated on the basis of the basis input dataset.

A comparison of the first element of each one of the first output datasets 12 with the first element of the respective one of the second output datasets 14 corresponding to the same one of the first input datasets 11 may be performed by an evaluation module 15. The evaluation module 15 may also compare the second element of each one of the first output datasets 12 with the second element of the respective one of the second output datasets 14 corresponding to the same one of the first input datasets 11.

Independent of the first use case, a successful adversarial attack may be considered if one of the first output datasets 12 may indicate a different entity compared to the respective one of the second output datasets 14 corresponding to the same one of the first input datasets 11. The evaluation module 15 may compare each element of each one of the first output datasets 12 with the respective element of the respective one of the second output datasets 14 corresponding to the same one of the first input datasets 11 in order to detect a successful adversarial attack.

The adversarial input datasets 13 may be used to train the AI-module 1. To realize this, an access to the AI-module may be necessary.

FIG. 2 shows a classifier 8 for classifying an adversarial attack to the AI-module 1 in dashed lines. The second computer system 120 may comprise the classifier 8 in further example. The classifier 8 may be a binary classifier and may output an alarm signal if the classifier detects the adversarial attack. The classifier 8 may be generated using the adversarial input datasets 13 and the first input datasets 11 and preferably using the machine learning module 4. The classifier 8 may calculate the above mentioned fourth metric to detect the adversarial attack. Preferably, the classifier 8 may be integrated in the interface 2.

The present disclosure may be a system, a method, and/or a computer program product at any possible technical detail level of integration. The computer program product may include a computer readable storage medium (or media) having computer readable program instructions thereon for causing a processor to carry out aspects of the present disclosure. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG.s illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIG.s. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer implemented method for testing an artificial intelligence module (AI-module), the method comprising:
    generating adversarial input datasets on the basis of the first input datasets using a substitute module, wherein the substitute model is based upon a first input datasets and a first output datasets processed by the AI module;
    sending the adversarial input datasets to the interface of the AI-module for processing the adversarial input datasets by the AI-module;
    receiving second output datasets calculated by the AI-module on the basis of the adversarial input datasets via the interface of the AI-module, each second output dataset corresponding to a respective one of the adversarial input datasets;
    assessing a resilience of the AI-module against adversarial attacking by using the first output datasets and the second output datasets, wherein sending the adversarial input datasets to the interface of the AI-module represents the adversarial attacking.

2. The method of claim 1, the method further comprising calculating a metric for assessing the resilience of the AI-module against adversarial attacking.

3. The method of claim 2, the method further comprising calculating a first score as the metric, the first score representing a proportion of successful adversarial attacks from all adversarial attacks using the adversarial input datasets.

4. The method of claim 1, the method further comprising generating the adversarial input datasets according to a spatial transformation attack method.

5. The method of claim 1, the method further comprising generating the adversarial input datasets according to a zeroth order oracle attack method.

6. The method of claim 1, the method further comprising generating the adversarial input datasets according to a decision based attack method.

7. The method of claim 1, the method further comprising generating the adversarial input datasets according to a query-efficient black box attack method.

8. The method of claim 1, the method further comprising generating the adversarial input datasets according to a fast gradient method.

9. The method of claim 1, the method further comprising generating a set of potential substitute modules with different module architectures using the first input datasets and the first output datasets, each potential substitute module substituting the AI-module, performing a comparison of performances of the potential substitute modules with respect to how accurately the potential substitute modules imitate the AI-module and selecting the substitute module from one of the potential substitute modules on the basis of the comparison.

10. The method of claim 9, the method further comprising performing the comparison of the performances of the potential substitute modules with respect to how accurately the potential substitute modules imitate the AI-module on the basis of a second metric.

11. The method of claim 10, wherein the second metric is a Cohen's kappa coefficient.

12. The method of claim 1, the method further comprising
    constructing non-adversarial input datasets and determining non-adversarial output datasets on the basis of the non-adversarial input datasets using the substitute module, each non-adversarial output dataset corresponding to a respective one of the non-adversarial input datasets;
    sending the non-adversarial input datasets to the interface of the AI-module for processing the non-adversarial input datasets by the AI-module;
    receiving third output datasets calculated by the AI-module on the basis of the non-adversarial input datasets via the interface of the AI-module, each third output dataset corresponding to a respective one of the non-adversarial input datasets;
    assessing the resilience of the AI-module against adversarial attacking in relation to non-adversarial use cases of the AI-module using the non-adversarial output datasets and the third output datasets, the non-adversarial use cases comprising an application of the AI-module to the non-adversarial input datasets.

13. The method of claim 12, the method further comprising calculating a single third metric for assessing the resilience of the AI-module against adversarial attacking in relation to the non-adversarial use cases of the AI-module.

14. The method of claim 13, the method further comprising calculating a second score as the third metric, the second score representing a ratio of a number of true positive instances to a sum of a number of the true positive instances and a number of false positive instances, the true positive instances representing cases, for which the adversarial attacking is successful, the false positive instances representing cases, for which the non-adversarial output datasets deviate from the third output datasets.

15. The method of claim 1, the method further comprising training the AI-module using the adversarial input datasets and the first output datasets.

16. The method of claim 1, the method further comprising training a classifier for classifying an adversarial attack to the AI-module using the adversarial input datasets and the first input datasets.

17. The method of claim 16, the method further comprising using the classifier for assessing a risk of the AI-module being under adversarial attack with respect to a batch of further input datasets, the further input datasets comprising further adversarial input datasets for the AI-module and further non-adversarial input datasets for the AI-module, calculating a fourth metric on the basis of the batch of the further input datasets using the classifier, the fourth metric representing the risk of the AI-module being under adversarial attack.

18. The method of claim 17, the fourth metric representing a ratio of a number of detected adversarial attacks to the AI-module being detected by the classifier to a number of detected non-adversarial use cases of the AI-module being detected by the classifier.

19. A computer program product comprising a computer-readable storage medium having computer-readable program code embodied therewith, the computer-readable program code configured to implement a method of:

generating adversarial input datasets on the basis of the first input datasets using substitute module for AI module, wherein the substitute model is based upon a first input datasets and a first output datasets processed by the AI module;;

sending the adversarial input datasets to the interface of the AI-module for processing the adversarial input datasets by the AI-module;

receiving second output datasets calculated by the AI-module on the basis of the adversarial input datasets via the interface of the AI-module, each second output dataset corresponding to a respective one of the adversarial input datasets;

assessing a resilience of the AI-module against adversarial attacking by using the first output datasets and the second output datasets, wherein sending the adversarial input datasets to the interface of the AI-module represents the adversarial attacking.

20. A computer system for testing an artificial intelligence module (AI-module), the computer system comprising:

at least one processor;

at least one memory component;

the at least one processor, and the at least one memory component configured to execute a method of:

sending first input datasets to an interface of the AI-module for processing the first input datasets by the AI-module;

receiving first output datasets calculated by the AI-module on the basis of the first input datasets via the interface of the AI-module, each first output dataset corresponding to a respective one of the first input datasets;

generating a substitute module using the first input datasets and the first output datasets, the substitute module substituting the AI-module;

generating adversarial input datasets on the basis of the first input datasets using the substitute module;

sending the adversarial input datasets to the interface of the AI-module for processing the adversarial input datasets by the AI-module;

receiving second output datasets calculated by the AI-module on the basis of the adversarial input datasets via the interface of the AI-module, each second output dataset corresponding to a respective one of the adversarial input datasets;

assessing a resilience of the AI-module against adversarial attacking by using the first output datasets and the second output datasets, wherein sending the adversarial input datasets to the interface of the AI-module represents the adversarial attacking.

\* \* \* \* \*